United States Patent
Thomas et al.

(10) Patent No.: US 9,357,206 B2
(45) Date of Patent: May 31, 2016

(54) SYSTEMS AND METHODS FOR ALIGNMENT, CALIBRATION AND RENDERING FOR AN ANGULAR SLICE TRUE-3D DISPLAY

(75) Inventors: Clarence E. Thomas, Knoxville, TN (US); David L. Page, Knoxville, TN (US)

(73) Assignee: Third Dimension IP LLC, Knoxville, TN (US)

( * ) Notice: Subject to any disclaimer, the term of this patent is extended or adjusted under 35 U.S.C. 154(b) by 1023 days.

(21) Appl. No.: 13/480,432

(22) Filed: May 24, 2012

(65) Prior Publication Data

US 2012/0300044 A1 Nov. 29, 2012

Related U.S. Application Data

(60) Provisional application No. 61/489,774, filed on May 25, 2011.

(51) Int. Cl.
*H04N 13/04* (2006.01)
*G06T 7/00* (2006.01)
*H04N 9/31* (2006.01)

(52) U.S. Cl.
CPC .......... *H04N 13/0445* (2013.01); *G06T 7/0042* (2013.01); *H04N 9/3147* (2013.01); *H04N9/3182* (2013.01); *H04N 9/3194* (2013.01); *H04N 13/0402* (2013.01); *H04N 13/0425* (2013.01); *H04N 13/0459* (2013.01); *G06T 2207/30204* (2013.01)

(58) Field of Classification Search
CPC .......... H04N 13/0445; H04N 13/0404; H04N 13/0459; H04N 13/0406; H04N 13/0409; H04N 13/0418; H04N 9/3147; H04N 9/3194; H04N 13/0055; H04N 13/021; H04N 13/0217; H04N 13/0228; H04N 13/0246; H04N 13/0282; H04N 13/0402; H04N 13/0422; H04N 13/0425; H04N 13/0431; H04N 13/0434; H04N 9/12; H04N 9/3182
USPC ........... 348/42, 744, 745, 806; 352/57, 60, 61
See application file for complete search history.

(56) References Cited

U.S. PATENT DOCUMENTS 6,456,339 B1 * 9/2002 Surati et al. .................. 348/745
7,544,919 B2 6/2009 Nattress
(Continued)

FOREIGN PATENT DOCUMENTS

WO WO 2011012913 A1 * 2/2011

OTHER PUBLICATIONS

Raskar, Multi-Projecctor Displays Using Camera-Based Registration, Oct. 29, 1999.

*Primary Examiner* — Sath V Perungavoor
*Assistant Examiner* — Nathnael Aynalem
(74) *Attorney, Agent, or Firm* — Law Offices of Mark L. Berrier

(57) ABSTRACT

Systems and methods for calibrating a 3D display system. In one embodiment, a system includes a display screen, 2D image projectors that project 2D projection images onto the screen and a camera that captures calibration images of the screen. A computer generates the 2D projection images, which include calibration patterns, and processes the captured calibration images. The computer uses the calibration images to calculate corrections based upon the calibration images. The computer can then generate corrected 2D projection images that are projected by the 2D image projectors onto the screen to produce a substantially visually correct 3D image with continuous viewing, true horizontal parallax, and a different view for each eye within a valid viewing zone. The corrections to the images may include corrections to the geometry (including distortion, alignment, etc.) color (including intensity and related parameters).

12 Claims, 10 Drawing Sheets

(56) References Cited

U.S. PATENT DOCUMENTS

| | | | |
|---|---|---|---|
| 8,730,130 B1* | 5/2014 | Pray et al. | 345/8 |
| 2002/0015052 A1* | 2/2002 | Deering | 345/647 |
| 2007/0097213 A1* | 5/2007 | Ajito | 348/189 |
| 2007/0273795 A1* | 11/2007 | Jaynes et al. | 348/745 |
| 2008/0012850 A1 | 1/2008 | Keating | |
| 2008/0129967 A1 | 6/2008 | Webb | |
| 2009/0059096 A1* | 3/2009 | Yamamoto et al. | 348/746 |
| 2012/0127320 A1* | 5/2012 | Balogh | 348/180 |

* cited by examiner

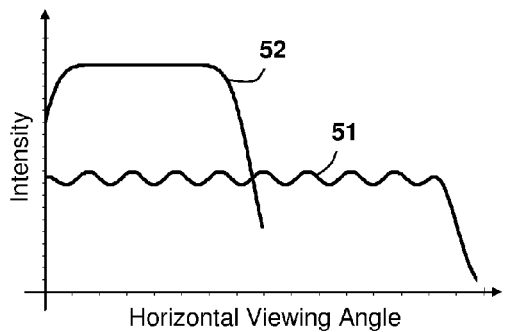
Fig. 4
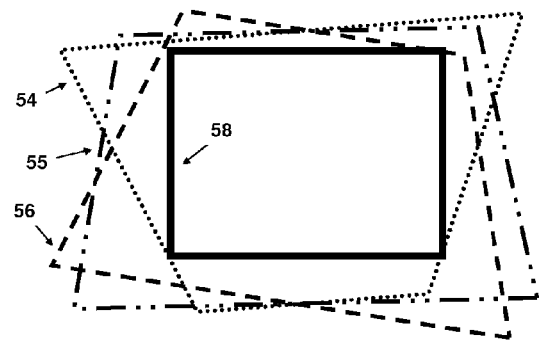
Fig. 5C
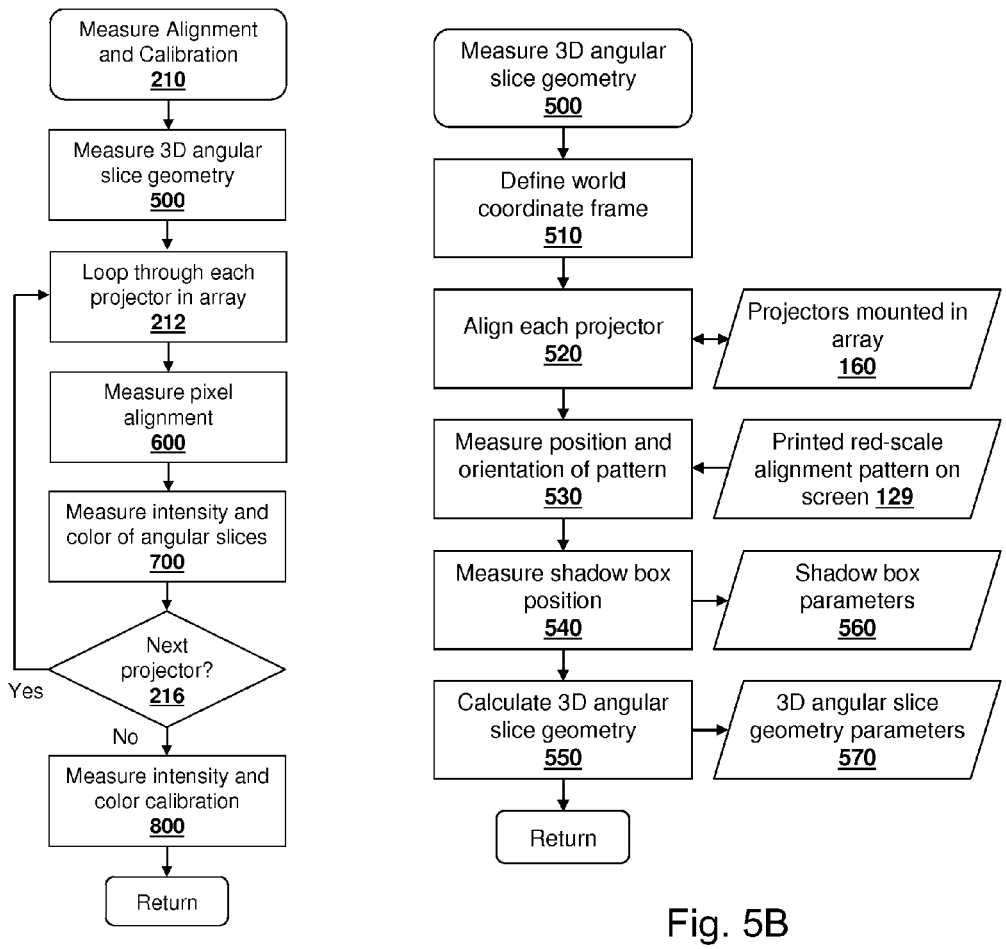
Fig. 5A
Fig. 5B

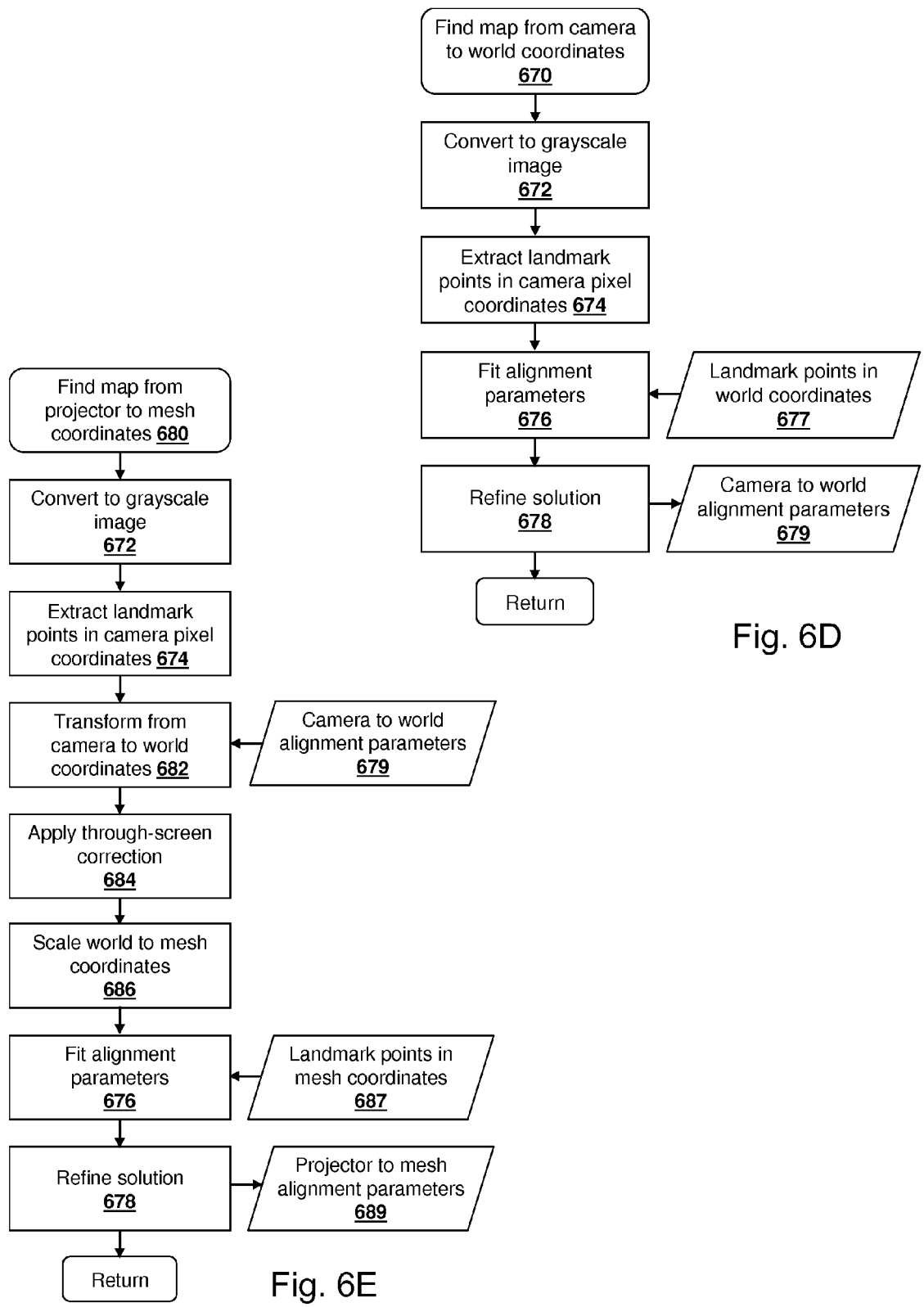

SYSTEMS AND METHODS FOR ALIGNMENT, CALIBRATION AND RENDERING FOR AN ANGULAR SLICE TRUE-3D DISPLAY

CROSS-REFERENCE TO RELATED APPLICATIONS

This application claims the benefit of U.S. Provisional Patent Application 61/489,774, by Clarence E. Thomas, et al., filed May 25, 2011 which is incorporated by reference as if set forth herein in its entirety.

BACKGROUND

1. Field of the Invention

The present invention relates generally to the field of three-dimensional (3D) displays. More specifically, the invention relates to a system and methods of alignment, calibration and rendering for angular slice true-3D display suitable for multiple viewers without use of glasses or tracking of viewer position, where each of the viewers' eyes sees a slightly different scene (stereopsis), and where the scene viewed by each eye changes as the eye changes position (parallax).

2. Related Art

Three-Dimensional Displays

Over the last 100 years, significant efforts have gone into developing three-dimensional (3D) displays. To date none of these efforts have been truly satisfactory. There are existing 3D display technologies, including DMD (digital-mirror-device, Texas Instruments) projection of illumination on a spinning disk in the interior of a globe (Actuality Systems); another volumetric display consisting of multiple LCD scattering panels that are alternately made clear or scattering to image a 3D volume (LightSpace/Vizta3D); stereoscopic systems requiring the user to wear goggles ("Crystal Eyes" and others); two-plane stereoscopic systems (actually dual 2D displays with parallax barrier, e.g. Sharp Actius RD3D); and lenticular stereoscopic arrays (many tiny lenses pointing in different directions, e.g., Phillips nine-angle display, SID, Spring 2005). Most of these systems are not particularly successful at producing a true 3D perspective at the users eye or else are inconvenient to use, as evidenced by the fact that the reader probably won't find one in her/his office. The Sharp notebook only provides two views (left eye and right eye, with a single angle for each eye), and the LightSpace display appears to produce very nice images, but in a limited volume (all located inside the monitor,) and would be very cumbersome to use as a projection display.

Beyond these technologies there are efforts in both Britain and Japan to produce a true holographic display. Holography was invented in the late 1940's by Gabor and started to flourish with the invention of the laser and off-axis holography. The British work is farthest along, and has actually produced a display that has a ~7 cm extent and an 8 degree field of view (FOV). While this is impressive, it requires 100 million pixels (Mpixels) to produce this 7 cm field in monochrome and, due to the laws of physics, displays far more data than the human eye can resolve from working viewing distances. A working 50 cm (20 inch) color holographic display with a 60-degree FOV would require 500 nanometer (nm) pixels (at least after optical demagnification, if not physically) and more than a Terapixel (1,000 billion pixels) display. These numbers are totally unworkable anytime in the near future, and even going to horizontal parallax only (HPO, or three-dimensional in the horizontal plane only) just brings the requirement down to 3 Gpixels (3 billion pixels.) Even 3 Gpixels per frame is still a very unworkable number and provides an order of magnitude more data than the human eye requires in this display size at normal working distances. Typical high-resolution displays have 250-micron pixels—a holographic display with 500 nm pixels would be a factor of 500 more dense than this—clearly far more data would be contained in a holographic display than the human eye needs or can even make use of at normal viewing distances. Much of this incredible data density in a true holographic display would just go to waste.

A volumetric 3D display has been proposed by Balogh and developed by Holografika. This system does not create an image on the viewing screen, but rather projects beams of light from the viewing screen to form images by intersecting the beams at a pixel point in space (either real—beams crossing between the screen and viewer, or virtual—beams apparently crossing behind the screen as seen by the viewer). Resolution of this type of device is greatly limited by the divergence of the beams leaving the screen, and the required resolution (pixel size and total number of pixels) starts to become very high for significant viewing volumes.

Eichenlaub teaches a method for generating multiple autostereoscopic (3D without glasses) viewing zones (typically eight are mentioned) using a high-speed light valve and beam-steering apparatus. This system does not have the continuously varying viewing zones desirable for a true 3D display, and has a large amount of very complicated optics. Neither does it teach how to place the optics in multiple horizontal lines (separated by small vertical angles) so that continuously variable autostereoscopic viewing is achieved. It also has the disadvantage of generating all images from a single light valve (thus requiring the very complicated optical systems), which cannot achieve the bandwidth required for continuously variable viewing zones.

Nakamuna, et al., have proposed an array of micro-LCD displays with projection optics, small apertures, and a giant Fresnel lens. The apertures segregate the image directions and the giant Fresnel lens focuses the images on a vertical diffuser screen. This system has a number of problems including: 1) extremely poor use of light (most of the light is thrown away due to the apertures); 2) exceedingly expensive optics and lots of them, or alternatively very poor image quality; 3) very expensive electronics for providing the 2D array of micro-LCD displays.

3D Alignment, Calibration and Rendering

Significant research is available on alignment and calibration systems for 2D image display using multiple projector systems with camera-based feedback. In 2007, Majumder and Brown reviewed these techniques. While these techniques lead to amazing results for 2D displays such as super-resolution and large tiled displays, the research does not address the needs for 3D angular slice display.

The rendering challenge of the angular slice 3D display is significant since each projector of the display requires a different perspective rendering. The current systems for multiple screen rendering do not address the needs. The 3D techniques do not address the needs for 3D angular slice display.

SUMMARY OF THE INVENTION

Therefore, there is a clear need for a method to align, calibrate and render a true 3D display, where each of the viewers' eyes not only sees a different scene, but the scene changes continuously as the viewers move their heads or change their positions from one angular location to another angular location with respect to the display screen. In one embodiment, multiple "angular slices" (scenes as viewed by a camera from a particular angular vantage point) are projected on to a viewing screen, which diffuses the angle illuminated by the projection lens projecting the scene into a particular vertical and horizontal angular slice, where the diffusion may be asymmetric. A camera is used as a feedback sensor to align the projected pixels of the angular slices with sub-pixel geometric correction and to calibrate the intensity and color across the slices for smoothing variations in intensity and color. A viewer observing the display screen will thus see a smoothly blended image (a different image for each eye and for each viewpoint) of the multiple slices. This smoothly blended image is a collection of angular slices where one projector in the true 3D display contributes one slice. A rendering method uses the alignment and calibration to generate a 2D angular slice image that drives each projector. The rendering creates a 2D angular slice image using an image projection with a horizontal focus at the projectors and a vertical focus at the viewer. Alternatively, a projection with the horizontal and vertical focus at the viewer can be used. This projection leads to some distortion in the aspect ratio of objects away from the plane of focus for the true 3D display. However, this projection allows use of images from real world cameras (either single frame or video) to drive the projectors directly without the rendering step. Finally, a control interface allows the viewer to control the amount of parallax and the focal plane of the continuously blended angular slice 3D.

One embodiment comprises a 3D display calibration system. This system includes a display screen, 2D image projectors that project 2D projection images onto the screen and a camera that captures calibration images of the screen. A computer generates the 2D projection images, which include calibration patterns, and processes the captured calibration images. The computer uses the calibration images to calculate corrections based upon the calibration images. The computer can then generate corrected 2D projection images that are projected by the 2D image projectors onto the screen to produce a substantially visually correct 3D image with continuous viewing, true horizontal parallax, and a different view for each eye within a valid viewing zone. The corrections to the images may include corrections to the geometry (including distortion, alignment, etc.) color (including intensity and related parameters). The system may also include an x-y measurement unit that is configured to measure the locations of the screen and projectors, and to use this information in generating corrections for the projected images. The screen may include fiducial markers to facilitate calculation of the corrections.

Another embodiment comprises a method for calibrating a 3D display system. The method begins with generation of 2D calibration patterns and projection of these images onto the system's display screen. Then, multiple calibration images of the patterns on the display screen are captured using a digital camera. Various parameters of the captured images are then measured, and correction parameters are calculated based on the measured image parameters. The correction parameters are stored for later use. The correction parameters are used to calibrate 2D images that are subsequently projected by the projectors of the 3D display system. The 3D display system loads the stored correction parameters and uses them to render 2D projection images from 3D image data. The corrected 2D projection images are projected onto the screen of the 3D display system, thereby producing a substantially visually correct 3D image with continuous viewing, true horizontal parallax, and a different view for each eye.

Numerous other embodiments are also possible.

BRIEF DESCRIPTION OF THE DRAWINGS

A clear conception of the advantages and features of embodiments of the present invention, and of the components and operation of model systems provided with the present invention, will become more readily apparent by referring to the exemplary, and therefore nonlimiting, embodiments illustrated in the text below and the accompanying drawings. In the drawings, closely related figures have the same number but different alphabetic suffixes.

FIG. 4 shows a plot of intensity variations as a function of view angle for different angular spacing of ten projectors.

FIGS. 5A to 5C show flowcharts and a sketch for a method of alignment and calibration in accordance with one embodiment.

FIGS. 6A to 6E show flowcharts for methods of pixel alignment in accordance with one embodiment.

Figure 1A:
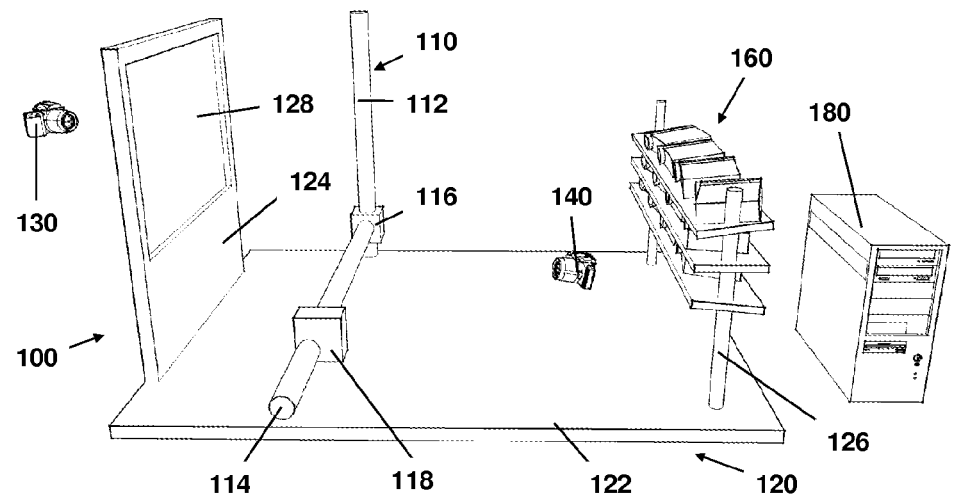
FIGS. 1A to 1D show various aspects of a system for alignment, calibration and rendering in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for calibrating 3D displays. In these systems and methods, calibration patterns are generated and projected by multiple projectors onto a screen of a 3D display. A digital camera captures images of the calibration patterns on the screen and these images are used to compute corrections for the projectors. The corrections are subsequently used in the rendering of 2D images from 3D data sets. The rendered images are projected by the projectors onto the screen to produce a substantially visually correct 3D image with continuous viewing, true horizontal parallax, and a different view for each eye within a valid viewing zone.

Figure 2:
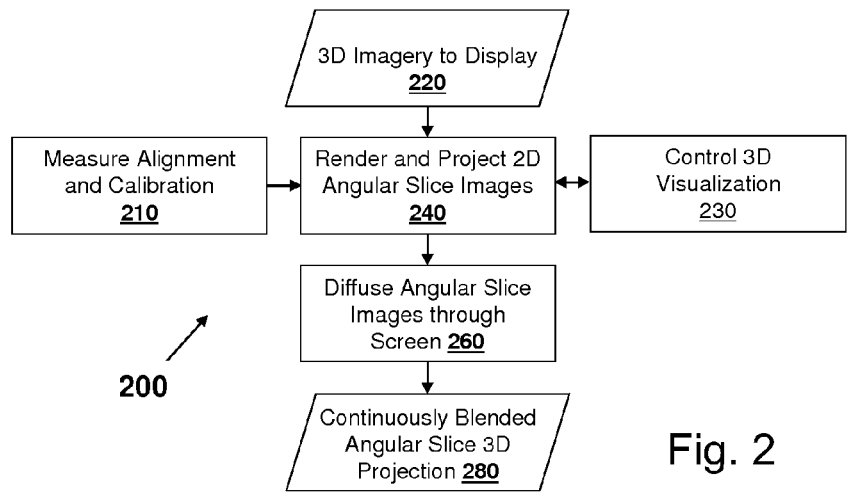
FIG. 2 shows a flowchart for aligning, calibrating and rendering 3D imagery into continuously blended angular slice 3D projections.

One embodiment of the alignment, calibration and rendering system is illustrated in FIG. 1A. The system is an angular slice 3D display 100 with a display stand 120, an array of projectors 160, a computer 180, an x-y measurement unit 110, a rear-facing digital camera 130 and a front-facing digital camera 140. In FIG. 2, A system flowchart 200 shows the sequence of steps to take 3D imagery input 220 and generate continuously blended angular slice 3D projections 280 as output. The steps include an alignment and calibration step 210, a rendering and projection step 240, a 3D visualization control step 230, and finally an angular slice diffusion step 260. In one embodiment, the input 220 is an application running on the computer in FIG. 1A, 180, that draws 3D scenes using a standard OpenGL-based graphics interface[21]. The OpenGL calls serve as input. However, other inputs are possible such as applications using Microsoft's proprietary graphics interface known as Direct3D, a sequence of digital video (or still) images representing different viewpoints of a real-world scene, a combination of digital images and depth maps as is possible with Microsoft's Kinect camera, or other inputs that suitably describe 3D imagery. The output and projection step 280 in FIG. 2 allows a viewer or multiple viewers to see the 3D imagery with stereoscopic depth perception and view parallax such that the viewers do not need special glasses.

The computer 180 in FIG. 1A has sufficient computational and graphics resources to drive the projector array 160 and the cameras 130 and 140. The cameras 130 and 140 could be, for instance, Canon Rebel XSi 12.2 MPixel Digital SLR cameras, or other suitable digitally accessible cameras. In one embodiment, the computer 180 has a dual hexacore CPU motherboard (6 cores with two hardware threads per CPU, for a total of 24 hardware threads). Other multi-CPU configurations are possible. In this same embodiment three high-performance graphics cards installed in a PCI-Express ultra-high-speed graphics bus are used. These cards have for instance six mini-Displayport (mini-DP) outputs each for a total of 18 mini-DP outs. Two-way video splitters are connected to 17 of the mini-DP outs with the remaining mini-DP connected to a standard 2D monitor. The graphics cards and the splitters allow the computer to drive 34 high-performance projectors with a pixel resolution of 800×600 per projector. However, other computers, graphics cards, splitters and projector arrangements are possible. One example is to use an additional six-port graphics card and replace the two-way video splitters with three-way video splitters. This combination would drive up to 69 projectors from a single computer.

Figure 1B:
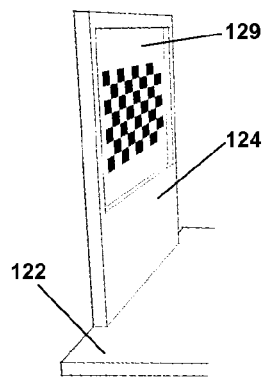
Figure 1D:
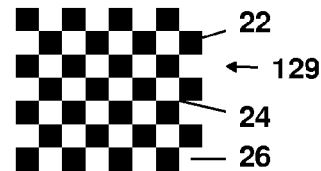
Figure 1C:
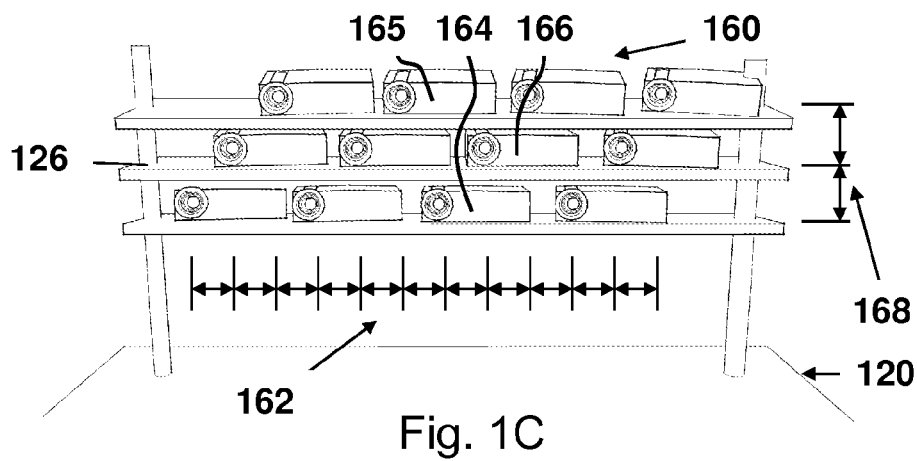

Returning to FIG. 1A the array of projectors 160 are shown with a front view in FIG. 1C. Projectors 164, 165, are 166 in FIG. 1C are a subset of the array 160 that are arbitrarily chosen to aid the discussions and descriptions that follow rather than referring to each projector in the array to illustrate a feature or concept when such a subset is sufficient.

Once more in FIG. 1A the stand 120 has a base 122, a screen bracket 124 and a projector array mount 126. In one embodiment, the construction materials for the display 120 are aluminum, wood, and polycarbonate to give structural support and to maintain geometric alignment through ambient temperature cycles. However, the stand can consist of any other material that can provide sufficient support and maintain alignment. The screen bracket 124 can hold either a diffusion screen 128 as shown in FIG. 1A or an opaque alignment pattern screen 129 as shown in FIG. 1B.

For horizontal parallax only (HPO) 3D imagery, the diffusion screen 128 shown in FIG. 1A diffuses light over a wide range vertically (say 60 degrees or more), but only over a very small angle horizontally (say one degree or so). An example of this type of asymmetric diffusion screen is a holographically produced Light Shaping Diffuser from Luminit LLC (1850 West 205th Street, Torrance, Calif. 90501, USA). Other types of diffusing screen with similar horizontal and vertical characteristics (e.g., arrays of micro-lenses) are usable.

FIG. 1D shows the alignment pattern screen 129. In one embodiment, the pattern is a printed chessboard[19, 27] with known spacing of chessboard boxes 22. The boxes 22 are red on a white background 26 to form inner corner points 24. Digital images of the pattern screen 129 and processing techniques such as edge extraction and line fitting allow the isolation of the points 24 with sub-pixel accuracy. The red-white pattern allows the alignment pattern to be fully captured by only the blue channel of a standard color digital camera. However, other patterns and color mappings are possible such that well-known digital image processing techniques can be applied to digital images of the patterns to isolate defined feature points at pixel or sub-pixel accuracy.

Returning to FIG. 1A when the diffusion screen 128 is in the screen bracket 124, the rear-facing camera 130 is positioned at one or more locations so that the camera field of view (FOV) contains the diffusion screen. On the other side of the screen bracket 124 is the front-facing color digital camera 140. When the alignment pattern screen 129 is in the screen bracket 124, the front-facing camera 140 is positioned at one or more locations so that the camera FOV contains the alignment pattern. In one embodiment, these cameras are connected to the computer 180 to transmit digital images captured with the cameras to the memory of the computer. However, other image transfer methods are possible such as wireless communication or storage cards.

Still in FIG. 1A at the back edge of the display stand 120 is the projector array mount 126 that holds the array of one or more digital projectors 160. The projectors 160 sit on the shelves of the array mount 126 such that the projected image from each projector fills the screen 128 or 129. The projectors may also be arranged in a partially marching array (only partially rotated) so that the projected image marches further away from the screen as projectors are added. Thus each projector is appropriately rotated and tilted. With the processing of the computer 180, the alignment and calibration step 210 use the cameras 130 and 140 to align with sub-pixel accuracy the projected images of the projectors 160 at the diffusion screen 128.

Figure 3A:
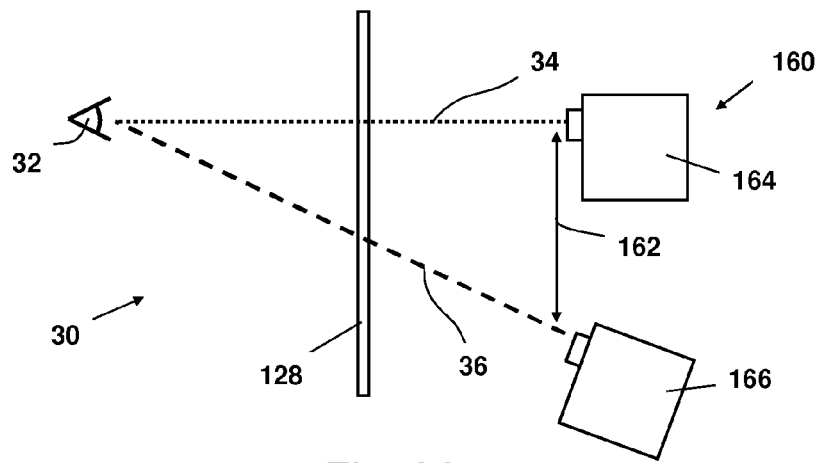
FIGS. 3A to 3B show geometry relationships and a plot of diffusion intensities for angular slice diffusion for two projectors as an example of the geometry and diffusion for an array of projectors.
Figure 3B:
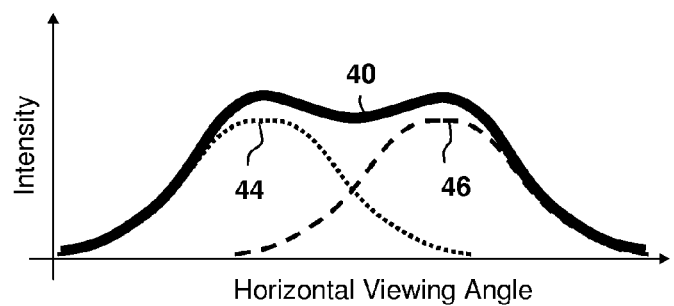

As shown in FIG. 1C, the projectors 160 are positioned with a horizontal spacing 162. The spacing 162 is defined by the diffusion screen 128 as illustrated in FIG. 3A and FIG. 3B. FIG. 3A is a top view of an angular slice geometry 30. A projector 164 and another projector 166 are a neighboring pair from the projector array 160. The projectors 164 and 166 are horizontally closest to each other in the array 160 but not necessarily vertically close. In other words, the projectors 164 and 166 are not necessarily sharing the same shelf on the array mount 126. Projector 164 projects a chief ray 34 of light towards a viewing position 32. Similarly, projector 166 projects a chief ray 36 of light towards the same viewing position 32. The diffusion screen 128 sits between the projectors and the view position. The rays 34 and 36 diffuse through the screen 128.

FIG. 3B plots the intensity of a continuous ensemble of light rays from each projector centered on each chief ray. The vertical axis of this plot shows the intensity as observed by the viewer at position 32 in FIG. 3A as a function of horizontal viewing angle. A Gaussian curve 44 in FIG. 3B approximates the diffusion of the continuous ensemble of light rays centered about the chief ray 34 in FIG. 3A. Similarly, a Gaussian curve 46 shown in FIG. 3B approximates the diffusion of the continuous ensemble of light rays centered about the chief ray 36 in FIG. 3A. A sum of Gaussians curve 40 in FIG. 3B is a superposition of the curves 44 and 46 when as shown in FIG. 3A both projectors 164 and 166 are illuminating the screen 128 with a constant and equal amount of light.

The angular projector spacing 162 should be chosen such that horizontally neighboring projectors are close enough as not to introduce perceptible intensity variation across the diffusion screen 128 in FIG. 1A. This variation results from the dip in the middle of the curve 40. As the projector spacing 162 shown in FIG. 3A increases, the curves 44 and 46 shown in FIG. 3B move further apart horizontally and thus the dip in curve 40 sags lower, which leads to more perceptible intensity variation. As the spacing shown in 162 shown in FIG. 3A decreases, the dip in curve 40 becomes less perceptible. FIG. 4 illustrates the effect of changes in projector spacing 162 shown in FIG. 3A. Ten equally spaced projectors yields a sum of Gaussians curve 51 (shown in FIG. 4) for the resulting intensities through the diffusion screen 128 shown in FIG. 1A. If the spacing of those ten projectors is reduced by half, then intensity becomes a sum of Gaussians curve 52 shown in FIG. 4. The curve 52 has less perceptible intensity variation than curve 51. The tradeoff is that reducing the spacing too much reduces the overall FOV of the 3D display 120.

The spacing 162 in FIG. 3A of the projectors 160 requires alignment with the x-y measurement unit 110 shown in FIG. 1a. The unit 110 consists of an x-scale travel 114 and a y-scale travel 112. A y-adjustment unit 116 enables the positioning of a targeting laser 118 to any position along the y travel 112 and the laser 118 travels on the x-travel 114. The location of any point on the display 100 within view of the laser 118 can be measured by reading the scales from the travels 114 and 112. This unit is used by the alignment and calibration step 210 from FIG. 2 to measure the projector spacing 162 in FIG. 3A relative to the alignment pattern screen 129 shown in FIG. 1B.

FIG. 1C also shows vertical differences 168 in the projector placement. For HPO, the vertical differences 168 are to allow the placement of the projectors for the horizontal spacing 162 to achieve the angular slice geometry 30 shown in FIG. 3A. Projectors with smaller physical dimensions allow fewer shelves for the array mount 126 shown in FIG. 1A with smaller overall vertical differences 168 shown in FIG. 1C. On the other hand, larger projectors require more shelves on the mount 126 and thus have larger vertical differences 168. Because the diffusion screen 128 shown in FIG. 1A has a finite vertical diffusion angle (60 degrees or more), the larger vertical differences 168 introduce small—but perceptible— vertical intensity variations in the angular slices.

Operation

First Embodiment

The flowchart 200 in FIG. 2 shows the steps for the alignment, calibration and rendering of 3D imagery using the display 100 from FIG. 1C. The first step in the operation is the alignment and calibration step 210. A more detailed flowchart of step 210 appears in FIG. 5A. An initial step 500 is to estimate the 3D angular geometry of the display 100. shown in FIG. 1A. Then a loop 212 is setup in the FIG. 1A computer 180 to cycle through each of the projectors 160. The loop 212 first performs a step 600 to measure the pixel alignment. This step uses the FIG. 1A camera 140 and the FIG. 1B pattern screen 129 to align with sub-pixel accuracy the projected images of the FIG. 1A projectors 160 to satisfy the FIG. 3A angular slice geometry 30. The loop 212 in step 700 next measures the intensity and color of angular slices using the camera 140 of FIG. 1A. This step measures the intensity and color variations that occur due to mismatches across the projectors 160 and due to vertically angular differences 168 of the projector positions. A check 216 determines if the loop is complete. Since the calibration of the intensity variations requires a solution across the projectors 160, an intensity and color calibration step 800 is preformed outside the loop 212 using the measurements from the step 700.

3D Geometry Alignment

FIG. 5B shows a more detailed flowchart for the step 500 to estimate the 3D angular slice geometry. This flowchart shows the steps for aligning and measuring the physical geometry of the display 100 using the x-y measurement unit 110. For this flowchart, the alignment screen 129 should be in the screen bracket 124. An initial step 510 is to define the world coordinate frame. The most direct definition is to use the scales of the x-y measurement unit 110. Then, an alignment step 520 involves moving the projectors 160 individually on the shelves of the mount 126 so that their horizontal spacing 162 matches the design angular slice geometry 30. This alignment is made by moving the targeting laser 118 using the x-y adjustment unit 116 to the desired spacing 162 as read from the x scale 114. The pointing direction of the laser 118 should be calibrated so that the direction is perpendicular to both the x-scale travel 114 and the y-scale travel 112. In one embodiment, the laser 118 has a setting to project a vertical line for alignment with the x scale 114 and a horizontal line for alignment with the y scale 112. With this unit 110, each of the projectors 160 can be moved to have the desired horizontal spacing 162. When the projectors 160 are moved they are also rotated and tilted appropriately so that their projected images fully illuminate the alignment screen 129 either totally, or in a marching fashion, as may be required by the particular design. Another step 530 now uses the x-y measurement unit 110 to align and measure the position and orientation of the alignment screen 129 mounted in the screen bracket 124 relative to the world coordinate frame.

A fourth step 540 involves locating a shadow box 58 as illustrated in FIG. 5C. The shadow box 58 is a rectangle on the alignment screen 129. The horizontal and vertical edges of this rectangle are defined to be aligned with the x and y axis of the world coordinate frame using the x-y measurement unit 110. Further, the shadow box 58 is the largest possible rectangle that fits inside the bounding edges of the projected images from all the projectors 160, except in the case where the projectors are marching and the edge of the last marching projector image is used as the bounding edge. A set of bounding edges 54, 55 and 56 for projectors 164, 165, and 166 are shown in FIG. 5C. The edges 54, 55 and 56 are not rectangular because the projectors are not necessarily square to alignment screen 129, and may also have some lens distortion. The shadow box 58 serves as a clipping region for each projected image from the projectors 160 so that the output of the display 280 has consistent bounding edges. A set of shadow box parameters 560 are stored in the memory of the computer 180 for use during the rendering step 240.

A final step 550 in FIG. 5B is to calculate a set of 3D angular slice geometry parameters 570 for use during the rendering step 240. These parameters 570 include but are not limited to the horizontal projector spacing 162, the vertical projector spacing 168, the position and orientation of the pattern on the alignment screen 129, and the distance of the projectors 160 from the alignment screen 129. The parameters 570 are stored in the memory of the computer 180 for use during the rendering step 240 shown in FIG. 2.

Pixel Alignment

Figure 6A:
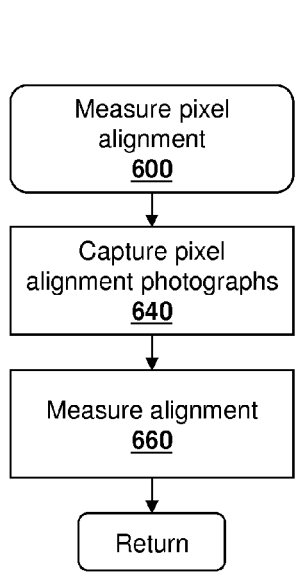

With the steps of the FIG. 5B flowchart complete, the loop 212 in FIG. 5A starts the step 600. A more detailed flowchart of 600 appears in FIG. 6A with two steps 640 and 660. The step 640 is the capture of projector alignment photographs with camera 140, and the following step 660 measures the pixel alignment from these photographs.

Figure 6B:
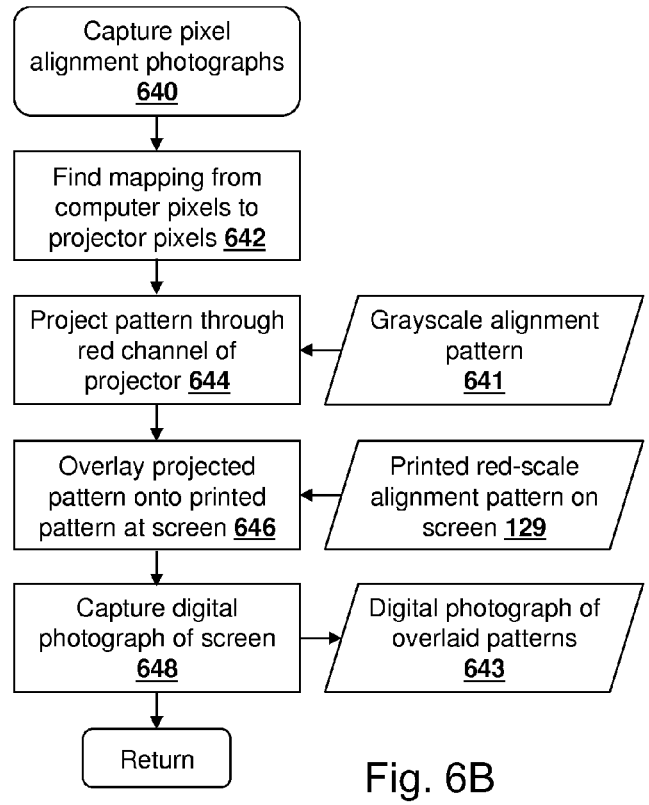

FIG. 6B shows a more detailed flowchart for the step 640. A first step 642 is to find the mapping of the pixel coordinate on the computer 180 to the pixel coordinates in each of the projectors 160. This mapping is automated using the camera 140 with the diffusion screen 128 to capture images as the computer 180 sequentially illuminates each projector. The relative position of the resulting angular slices reveals the mapping.

Now, the camera 140 and the alignment screen 129 are used by a projection step 644. This step sends a grayscale alignment pattern 641 from the computer 180 to the current projector in the loop 212. The pattern 641 is similar to the printed pattern on the alignment screen 129. The pattern 641 is projected through the red channel of the current projector while the green and blue channels are set to their corresponding black levels. An overlay 646 of the projected pattern 641 appears on the printed pattern of the alignment screen 129. The pattern of the screen 129 is red and white. When a digital photograph 643 is captured by the camera 140 in step 648, the red-white printed pattern 129 and red-white projected light pattern 641 are separated primarily into the blue channel and red channel, respectively, of the camera 140. The digital photograph 643 is stored in the memory of the computer 180 for later processing.

Figure 6C:
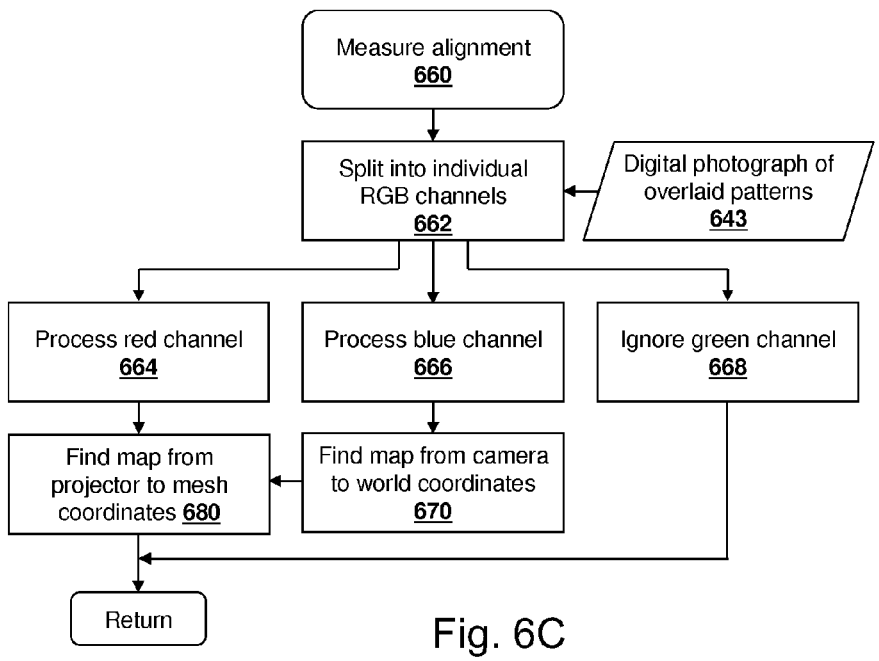

FIG. 6C shows a more detailed flowchart for the next step 660 in 600. A split operation 662 is performed on the digital photograph 643 of the overlaid projected pattern 641 on the printed pattern screen 129. The split operation 662 separates 643 into three color channels: red, green and blue (RGB). A no-operation step 668 ignores the green channel while steps 664 and 666 process the red and blue channels, respectively. This channel split allows capture of the screen pattern and projector pattern at the same time.

FIG. 6D shows a flowchart for an initial step 670 on the blue channel 666. The step 670 finds the mapping from camera pixels to world coordinates as defined in 510. A conversion step 672 changes the blue channel image into a grayscale image. This grayscale image primarily contains pixel information for the red-white printed pattern for the alignment screen 129 with little or no pixel information for the red-white projected light pattern 641. Then, an extraction step 674 segments inner corners 24 of the chessboard pattern for 129. These corners are landmark points with calibrated world coordinates 677 as measured in step 530. A fitting step 676 then solves for ten parameters of a cubic polynomial equation for both the x and y world coordinates (a total of 20 parameters). A refinement step 678 further improves the solution and the parameters 679 are stored in the memory of the computer 180 for use in step 680.

Figure 7:
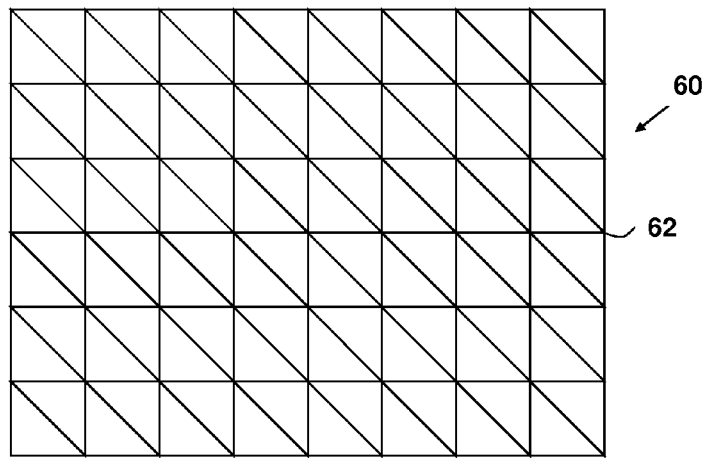
FIG. 7 shows an alignment mesh.

FIG. 6E shows a flowchart of an initial step 680 on the red channel 664. Using the parameters 679 from step 670, the step 680 finds a mapping from the projector pixels to an alignment mesh 60 shown in FIG. 7. The mesh 60 is used during the rendering step 280 to align the projected pixels. A node 62 of the mesh is the junction of connected triangle edges. The conversion step 672 is applied to change the red channel into a grayscale image. This grayscale image primarily contains pixel information from the red-white projected light pattern 641 from the current projector of the loop 212 with little or no pixel information from the red-white printed alignment screen 129. Then, the extraction step 674 segments the measured inner corners 24 of the pattern 641. Using the camera to world alignment parameters 679, a transform step maps the measured inner corners 24 from camera pixel coordinates to world coordinates as defined in 510. A correction step 684 adjusts the y coordinates of the measured inner corners 24 to account for vertical diffusion through the screen. This correction accounts for the thickness of the diffusion screen 128. A scaling step 686 converts the world coordinates of the inner corners 24 to coordinates for the mesh 60. The fitting step 676 is applied using calibrated mesh coordinates for the inner corners 24. The result is ten parameter solution of a cubic polynomial for both the x and y dimension of the mesh 60 (a total of 20 parameters). The refinement step 678 further improves the solution and the parameters 689 are stored in the memory of the computer 180 for use in the rendering step 240. The pixel alignment step 600 is now complete.

Intensity and Color Calibration

Figure 8:
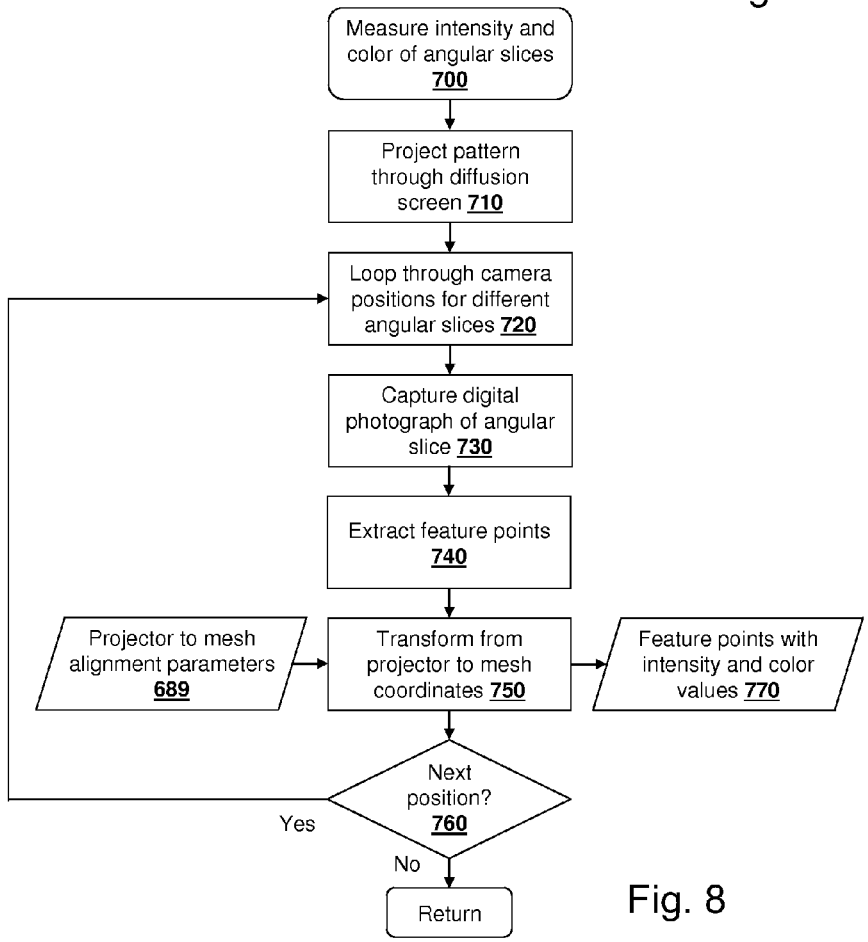
FIG. 8 shows a flowchart to measure intensity and color variations of angular slices through a diffusion screen.

FIG. 8 shows a flowchart of the next step 700 to measure the intensity and color of angular slices. Since the intensity and color calibration step 800 requires measurements from each of the projectors 160, this step 700 occurs within the loop 212 while the step 800 is outside the loop after the collection of measurements is made. The camera 130 is used as a sensor for intensity and color in this step since relative measurements among the projectors is needed. However, other sensors are possible such as a spectroradiometer or a colorimeter. The diffusion screen 128 is mounted in the screen bracket 124 for this step since the vertical projector differences 168 lead to vertical intensity variations within an angular slice stripe. Thus, the intensity and color calibration must be made with projected images through the diffusion screen. An initial step 710 projects a pattern with known intensity and color variation such that the projector coordinates can be determined given the pattern. A loop 720 allows for different horizontally-spaced positions of the camera 130 in front of the display 100. In one embodiment, three camera positions are used such as left, right and center. However, other positions are possible. The different camera positions see different angular slices from the current projector of loop 212. For each camera position, a capture step 730 creates a digital photograph of the slice. A processing step 740 extracts feature points from the angular slice in the photograph. The relative intensity and color pattern around the feature points determines the mapping of the feature points to projector coordinates. A transform step 750 uses the parameters 689 to map the feature points in mesh coordinates. These coordinates along with their associated intensity and color values 770 are stored in the memory of the computer 180. A loop check 760 determines if there are more camera positions. The stored intensity and color values are used to generate polynomial intensity and color fits for each projector, to be used during rendering and display of the 3D images.

Figure 9A:
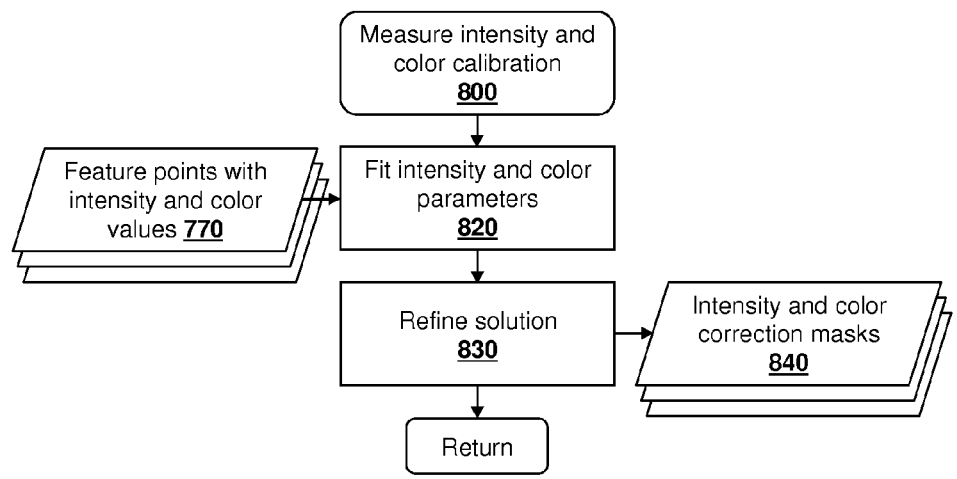
FIGS. 9A to 9C show a flowchart and plots that illustrate a method for intensity and color calibration in accordance with one embodiment.
Figure 9B:
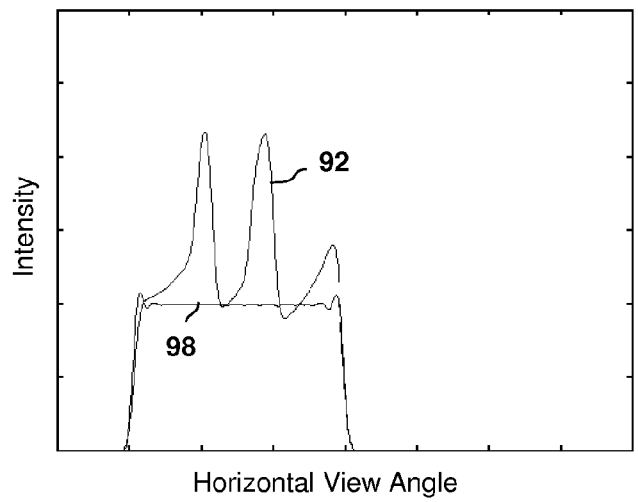
Figure 9C:
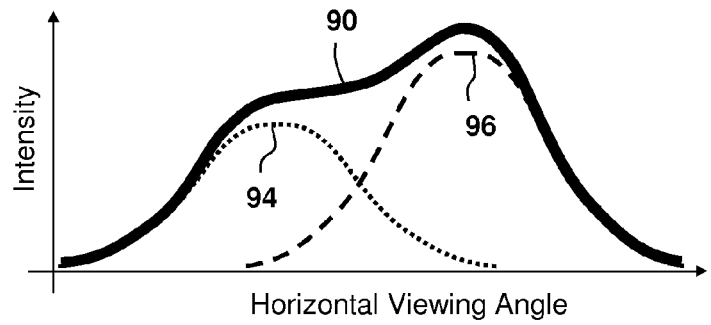

FIG. 9A shows a flowchart for the measurement of the intensity and color calibration step 800. A fitting step 820 takes the feature points 770 in mesh coordinates and their associated intensity and color values and solves for a scale factor for each RGB component. In a refinement step 830, the scale factors are interpolated to the nodes of the alignment mesh 60 to create intensity and color correction masks 840 for each RGB channel of the projectors 160. FIG. 9B shows a graph as an example of the fitting step 820. The graph shows a curve 92 that is the intensity as a function of horizontal view angle. This curve 92 is the horizontal intensity profile of 30 angular slices after diffusing through the screen 128. The angular slices are from 30 projectors that have differences in vertical projector positions 168. Angular slice intensity has a Gaussian profile relative to horizontal view angle as shown in FIG. 9C for given view position. A mismatch in intensity of a slice to another slice 96 leads to a non-uniform intensity profile 90. The non-uniform profile 90 is for two slices while the curve 92 is for 30 slices. The fitting step 820 and refinement step 840 lead to a more uniform intensity profile 98. The flowchart in FIG. 9A completes the details for the alignment and calibration step 210 from FIG. 5a.

Rendering and Projection

Figure 10:
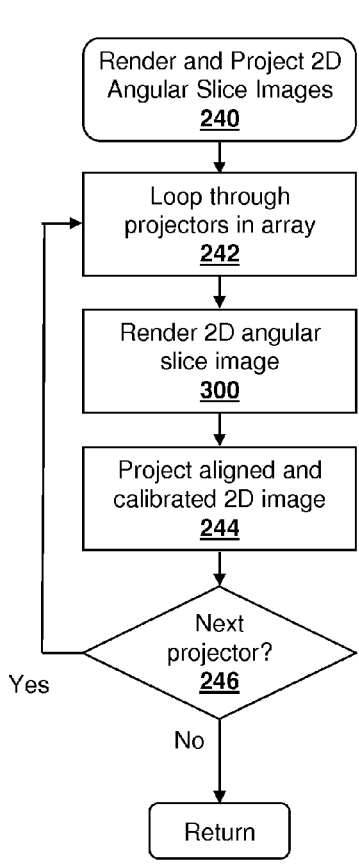
FIG. 10 shows a flowchart rendering and projecting 2D angular slice images.

With the display 100 aligned and calibrated, FIG. 10 illustrates a flowchart for the rendering and projection step 240 of the 3D imagery 220. In one embodiment, a loop 242 through the projectors 160 sequentially renders the aligned and calibrated images for each projector. However, other processing is possible such as parallel rendering where each projector has an associated rendering process running in parallel on the computer 180. Since the computer 180 drives the projectors 160, the images are frame synchronized at the software layer with inter-process communication calls. In the loop 242, a rendering step 300 transforms the 3D imagery 220 into an angular slice image with calibration corrections. Then, a projection step 244 sends these images to the projectors 160 that project the images onto the diffusion screen 128. It should be noted that the rendering steps do not necessarily run on the CPU's of the computer 180 they can just as well be run on the CPU's contained in the computer.

Figure 11A:
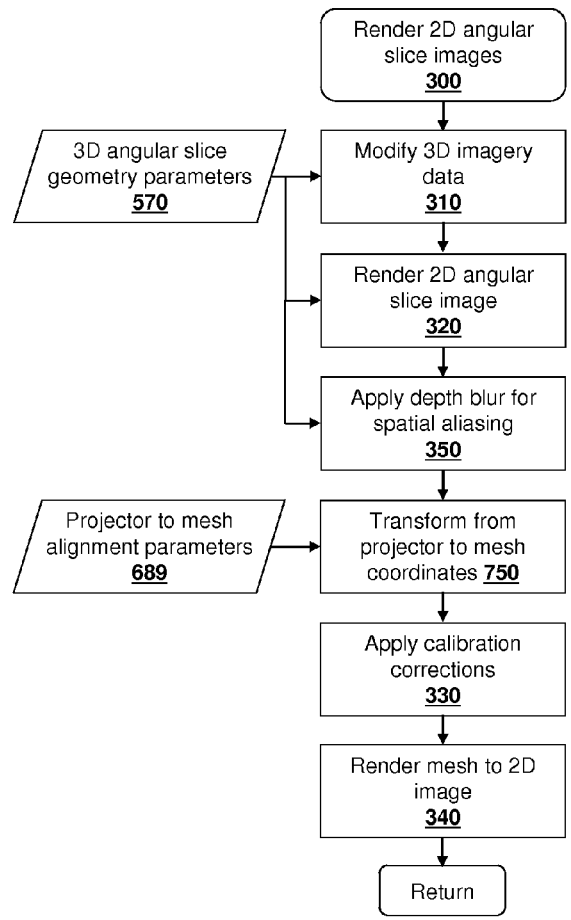
FIGS. 11A to 11F show a flowchart and sketches to illustrate the steps for rendering 2D angular slice images from 3D imagery.

FIG. 11A shows a flowchart for the rendering step 300. In one embodiment, the rendering is accomplished with OpenGL calls on the computer 180. With 3D imagery from an OpenGL application, an OpenGL wrapper (similar to the Chromium[31] wrapper) is used to intercept the application OpenGL calls before the calls are sent to a graphics card on the computer 180. However, other rendering approaches are possible such as using a wrapper for Microsoft's Direct3D or by building an application that does not need a graphics library wrapper but instead makes graphics calls that directly support the Angular Slice 3D Display. The rendering step 300 consists of a two-pass rendering for each frame of the original OpenGL calls. The first pass involves steps 310 and 320 that render a 2D angular slice image from the 3D imagery. The second pass uses this image as a texture map on the alignment mesh 60 in steps 750 and 330. Then, a final step 340 renders the mesh 60 with the texture map into an image to send to the appropriate projector for display.

Figure 11B:
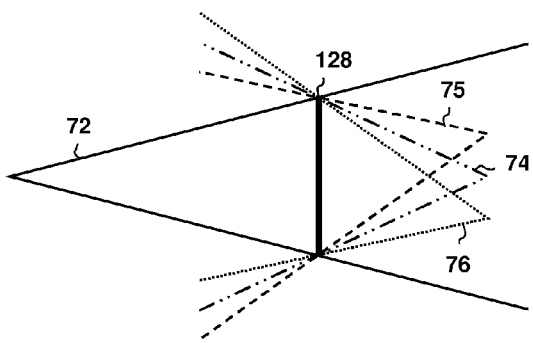

The step 310 modifies the view geometry associated with the application OpenGL calls using the 3D angular slice geometry parameters 570. A single viewpoint from the original OpenGL application is not sufficient. Thus step 310 modifies the original viewpoint to match the horizontal offset 162 and subsequent horizontal rotation of the current projector from the loop 242. In this manner, a new viewpoint is created that matches the angular slice geometry for each of the projectors 160. FIG. 11B illustrates (with a top view looking down on the diffusion screen 128) the viewpoint modification 310 for the three projectors 164, 165, and 166. A view frustum 72 shows the original viewpoint 70 from the OpenGL application. The frustum 72 appears on the side of the diffusion screen opposite the projectors 160 in a position where an observer would view the display 100. For projector 165 viewpoint, the modification in step 310 would redefine the OpenGL 3D geometry to create a new view projection 75. In a similar manner, view projections 74 and 76 represent the modifications for projectors 164 and 165 viewpoints, respectively. The view projections 74, 75, and 76 are located the same distance from the screen 128 as the projectors 160 and have the same horizontal spacing 162. The vertical differences 168 of the projectors are ignored and the viewpoints of the view projections 74, 75, and 76 have the same vertical position.

Figure 11C:
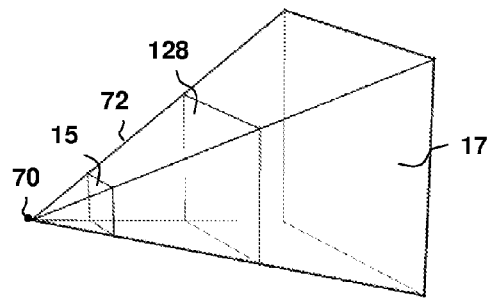

The first-pass rendering step 320 generates a 2D angular slice image of the 3D imagery. This step 320 uses a different view projection from a traditional frustum found in OpenGL applications. A traditional view frustum 72 is illustrated in FIG. 11C. This frustum 72 consists of the viewpoint 70, a near clipping plane 15 and a far clipping plane 17. For clarity, this illustration also shows the location of the diffusion screen 128 although in an OpenGL application this screen location is not considered. The frustum 72 renders an image that is equivalent to a pinhole camera. FIG. 11D shows a view projection 74 that allows rendering 2D angular slice images for the viewpoint of projector 164. The other projectors 160 have similar view projections. The view projection 74 has a viewpoint 14, a near clipping plane 16 and a far clipping plane 18. The diffusion screen 128 is also shown as the plane of projection is parallel to the screen plane. In other words, the view projection 74 behaves like a camera with a decentering lens that renders the 2D angular slice image parallel with the screen. The view projection 74 has different locations for the horizontal and vertical foci. The horizontal focus is a vertical line at the projector position 164 while the vertical focus is a horizontal line at the viewer position 14.

Figure 11E:
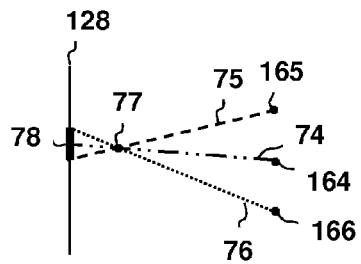
Figure 11D:
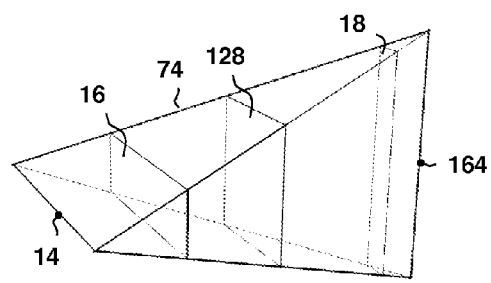
Figure 11F:
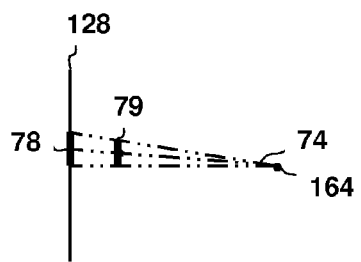

The projection 74 does not account for spatial aliasing illustrated in FIG. 11E, which is a top view that follows FIG. 11B. A 3D point 77 has a distance in depth from the screen 128. The point 77 has projections to different 2D locations on the screen 128 for the three example projections 74, 75, and 76 from FIG. 11B. An extent 78 of these projections on the 2D screen is shown. In FIG. 11F, the extent 78 has the same projection for view projection 74 as if the point 77 had a spatial extent 79. This spatial extent 79 is spatial aliasing. A step 350 applies a pixel blur as a function of depth to band-limit the spatial frequencies in the horizontal direction. Objects in the 3D imagery that are near the screen have very little spatial aliasing such that objects in the plane of the screen are in perfect focus. As objects move away from the screen in depth, they exhibit more spatial aliasing. The depth-based blur processing in step 350 smooths out this spatial aliasing leading to imaging results that are similar to depth-of-field defocusing in a camera lens.

Figure 12:
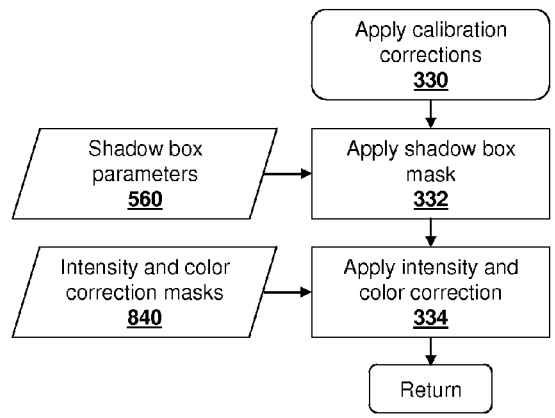
FIG. 12 shows a flowchart for applying calibration corrections to 2D angular slice images for projection onto a diffusion screen.

In the second rendering pass, the step 750 transforms the 2D angular slice image into mesh coordinates using the parameters 689. The transformed image is applied to the mesh 60 as a texture map. Then, a calibration step 330 applies corrections for intensity and color. FIG. 12 shows a flowchart for this step. Step 332 applies a shadow box mask based on parameters 560 to blackout projector pixels outside the shadow box 58. Finally, step 334 applies intensity and color correction masks 840 to each color layer of the image texture. This aligned and calibrated texture image on the alignment mesh 60 is now rendered. This second pass rendering creates the appropriate image to send to the projector for step 244.

Once the loop 242 renders images for each of the projectors 160, then the rendering step 240 can move to the next frame of the 3D imagery 220.

Control 3D Visualization

Figure 13:
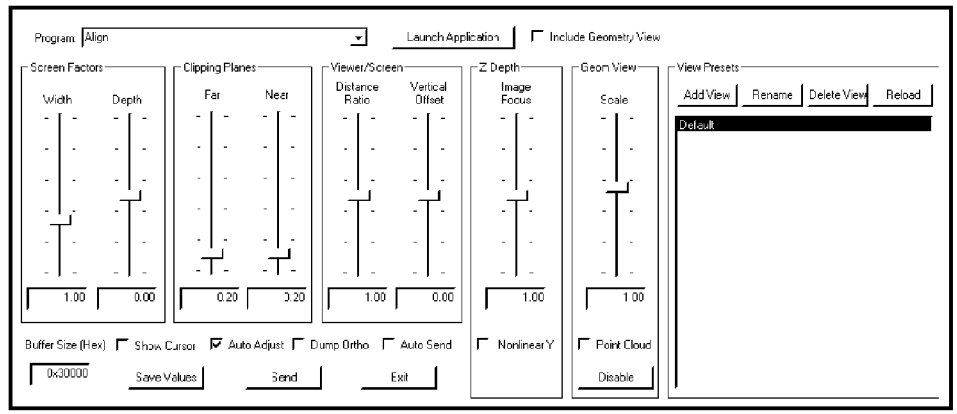
FIG. 13 shows an example of a control interface in accordance with one embodiment.

The rendering step 240 has several free parameters that allow control of the continuously blended angular slice 3D projection 280. A control step 230 allows the user to modify these parameters in real-time. In one embodiment, a user interacts with the control. FIG. 13 is a screen shot of a graphical user interface (GUI) that illustrates some of the parameters that can be controlled. However, other automated control mechanisms are possible that do not require user interaction. A function of the step 230 is to change the amount of parallax in the projection 280, which in turn changes the amount of spatial aliasing at a given depth. More parallax leads to more spatial aliasing. The control step 230 allows a tradeoff between parallax and aliasing. Another function of the control step 230 is the placement of focus plane. Objects in the 3D imagery 220 that are rendered at the screen 128 are in focus. Objects not at the screen have spatial aliasing as a function of depth. The control step 128 allows specification of where the focus plane is within the 3D imagery 220. The modification of other parameters in the control step 230 is possible such as scaling the 3D imagery, moving the clipping planes and changing the view aspect ratio. Additionally, the viewing angles can also be adjusted.

Additional Embodiments

Pixel Alignment Through Diffusion Screen

An additional embodiment is to use a calibrated camera in place of camera 130. With a calibrated camera, the alignment screen 129 and the front-facing camera 140 are not needed for the pixel alignment step 600. A set of known fiducial markers can be placed on the front of the screen bracket 124 within the FOV of the calibrated camera. Then using photogrammetry to recover the relationship for transforming the camera coordinates to world coordinates of step 682. Since the calibrated camera is viewing projections through the diffusion screen 128, the camera sees a single angular slice from each of the projectors when the camera has an appropriate exposure setting to capture a suitable image of the angular slice. Thus for the camera to capture enough landmark points from each projector, the camera must be moved to different locations to get different angular slice information. Alternatively, a single location of the camera is possible by cycling through different exposure settings and capturing multiple images for one projector. For each image, the overexposed and underexposed portions of the image can be removed and the remaining portions collected together into a single multiple-exposure image. This multiple-exposure image can then be used by step 680 to find the mapping from project to mesh coordinates. Alternatively, the calibrated camera can be place in the front-facing position 140 for reflective alignment.

Gap-Filling Projectors

Another embodiment uses gap-filling projectors to improve intensity variations resulting from differences in vertical locations 168. The gap-filling projectors are placed in positions vertically above or below the projectors 160 such that angular slices through the diffusion screen for these projectors fill intensity variations. Horizontal positions of the gap-filling projectors are relative to the horizontal projector spacing 162 and the projectors immediately above or below. The gap-filling projectors follow the same alignment, calibration and rendering steps 200 as other projectors.

Direct 3D Imagery Display

Figure 14A:
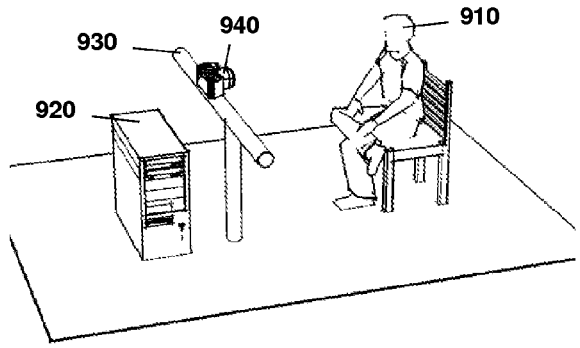
FIGS. 14A to 14C show image and video capture for real world 3D display.

Another embodiment replaces the projection in FIG. 11D used in step 320 with the more traditional frustum projection in FIG. 11C. The projection in FIG. 11C provides an approximation of the projection geometry in FIG. 11D that is suitable for objects in the 3D imagery near the plane of focus for the display 100. The imagery can be OpenGL generated imagery, or a camera is used to acquire a sequence of 2D images of an object to be displayed as a 3D image on the Angular Slice Display. For camera acquisition each image of the sequence of images is displaced horizontally, either in hardware or (by interpolation) in software from the previous image, so that a full set of parallax images is provided to the 3D display, one for each projector. FIG. 14A illustrates image capture for horizontally displacing a camera 940 mounted on a slider rail 930 to capture images of a subject 910. A computer 920 is shown for interfacing with the camera. The parallax (horizontal displacement) may match the parallax of the projectors, or may be larger or smaller than the parallax of the projectors, in order to accentuate or minimize the apparent z-displacement (displacement away from or towards the viewer) with respect to the projectors. If an object(s) is aligned so that it is in a line with the camera and the diffusion screen, then the image in the sequence of images to be displayed should be left-right inverted and be sent to the projector that is diagonally opposite the image with respect to the viewing screen. This geometry is only used for reference in distributing the images. There is no need for the objects being photographed for 3D display to be anywhere near the display diffusion screen. For camera images no OpenGL rendering step is required—all that is required is to apply the geometry, color, pixel alignment, and intensity calibrations described above to each respective image for use with it's respective projector. It is not necessary to use a single camera, but may be convenient in order to decrease the expense of 3D photography for the Angular Slice Display. In the event of multiple horizontally displaced cameras, additional calibration is performed as described below in the next paragraph.

Direct 3D Video Display

Figures 14B, 14C:
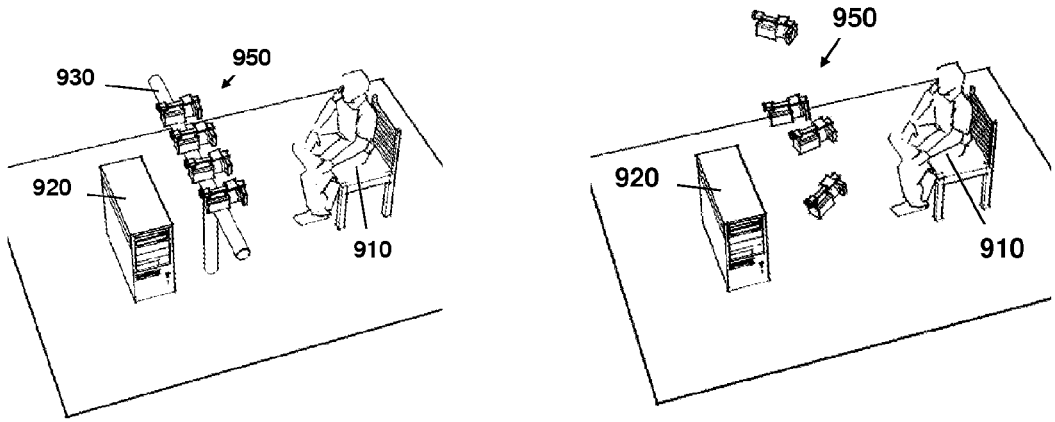

Another embodiment replaces the rendered image from steps 310, 320, and 350 in 300 with an image from a video camera where one camera is needed for each of the projectors. FIG. 14B shows video capture with one or more video cameras 950 mounted on the rail 930 and interfaced with the computer 920. Because the perspective projection in FIG. 11C provides an approximation of the projection geometry for objects near the plane of focus, the images from the video camera can drive the display directly. Again if the video camera, object being viewed, and the diffusion screen of the display are placed in line, then the video camera diagonally opposite the projector in the array sends its left-right inverted images to that projector, through the computer(s). The video cameras should be placed in a horizontal line orthogonal to the view direction of the central video camera with equal spacing between the cameras. To align the video camera pixels with the display 100, an alignment pattern similar to 129 can be placed at the plane of focus for the video camera array. Then an image of the alignment pattern from each video camera can used to replace 641. As a result, the pixel alignment step 600 will align the video camera pixels to the alignment mesh 160 and step 750 of 300 can proceed. In another implementation, fewer video cameras than projectors can be used, where images are generated for instance directly for every second or every third projector, and images from the projectors between are generated by interpolation of the video camera images. Again, the parallax between video cameras does not necessarily have to match the parallax between projectors, the horizontal spacing of the cameras can be either larger or less than the geometrically equivalent spacing of the projectors, so that either more or less parallax is produced in the 3D image. Additionally time of flight (tof) cameras can be used to directly capture 3D data points and images. The TOF camera provides x, y, and z coordinates to points in the image, and the image can be rendered as a texture over the 3D data points, just like OpenGL data.

3D Video Display with Angular Slice DIBR

An additional embodiment uses multiple video cameras (two or more) to capture 3D information about a scene. FIG. 14C illustrates the video capture with two or more video cameras 950 interfaced to the computer 920. Depth information about the scene is computed using feature matching and depth estimation techniques. Then steps 310 and 320 are replaced with depth-image based rendering (DIBR) techniques where the geometry parameters 570 and the projection in FIG. 11D drive the DIBR rendering. The DIBR rendered images are then passed to step 350.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A 3D display calibration system comprising:
   a display screen;
   a camera configured to capture calibration images of the screen;
   one or more 2D image projectors configured to project a plurality of 2D projection images onto the screen, wherein a projection frustum for the 2D projection images has different locations for a horizontal focus and a vertical focus, wherein the horizontal focus is a vertical line at the 2D image projector and the vertical focus is a horizontal line at a viewer position; and
   a computer configured to generate the 2D projection images and to process the calibration images captured by the camera;
   wherein the 2D projection images are calibration patterns;
   wherein the camera captures the calibration images of the screen while the calibration patterns illuminate the screen;
   wherein the computer calculates corrections to the 2D projection images in dependence upon the calibration images.

2. The 3D display calibration system of claim 1, wherein the computer is configured to generate a plurality of corrected 2D projection images, and wherein the one or more 2D image projectors are configured to project the plurality of corrected 2D projection images onto the screen, thereby producing a substantially visually correct 3D image with continuous viewing, true horizontal parallax, and a different view for each eye within a valid viewing zone.

3. The 3D display calibration system of claim 1, wherein the computer calculates geometry corrections to the 2D projection images in dependence upon the calibration images.

4. The 3D display calibration system of claim 1, wherein the computer calculates color and intensity corrections to the 2D projection images in dependence upon the calibration images.

5. The 3D display calibration system of claim 1, further comprising an x-y measurement unit configured to measure the locations of the screen and projectors.

6. The 3D display calibration system of claim 1, wherein the screen has fiducial markers.

7. A method comprising:
   capturing multiple 2D images of calibration patterns that are projected by multiple projectors onto a display screen of a 3D display system, wherein a projection frustum for the 2D images has different locations for a horizontal focus and a vertical focus, wherein the horizontal focus is a vertical line at the 2D image projector and the vertical focus is a horizontal line at a viewer position;
   measuring image parameters of the multiple 2D images;
   generating correction parameters based on the measured image parameters, wherein correction parameters calibrate 2D images projected by the projectors of the 3D display system; and
   storing the correction parameters.

8. A method for calibrating a 3D display system, the method comprising:
   generating multiple 2D pattern images;
   projecting the multiple 2D pattern images on a screen of the 3D display system through a projection frustum with different locations for a horizontal focus and a vertical focus, wherein the horizontal focus is a vertical line at the 2D image projector and the vertical focus is a horizontal line at a viewer position;
   acquiring multiple 2D calibration images with a digital camera;
   calculating calibration parameters from the multiple 2D calibration images; and
   storing the calibration parameters.

9. The method for calibrating the 3D display system of claim 8, further comprising:
   loading the alignment and calibration parameters during 3D image rendering;
   rendering a set of 2D projection images from 3D image data, wherein the 2D projection images are corrected by the calibration parameters; and
   projecting the 2D projection images onto the screen of the 3D display system, thereby producing a substantially visually correct 3D image with continuous viewing, true horizontal parallax, and a different view for each eye.

10. The 3D display calibration system of claim 9, wherein the 2D projection images incorporate geometry corrections derived from the calibration parameters.

11. The 3D display calibration system of claim 9, wherein the 2D projection images incorporate color and intensity corrections derived from the calibration parameters.

12. The 3D display calibration system of claim 9, wherein the 2D projection images incorporate projection calculations derived from different horizontal and vertical foci.

* * * * *